United States Patent [19]

Popp et al.

[11] Patent Number: 4,765,525

[45] Date of Patent: Aug. 23, 1988

[54] APPARATUS FOR REMOTELY WELDING A COVER TO THE WALL OF A CONTAINER FOR STORING RADIOACTIVE FUEL ELEMENTS AND WASTES

[75] Inventors: Franz W. Popp, Wedemark; Günter Geisert, Leimen-Gauangelloch, both of Fed. Rep. of Germany

[73] Assignee: Nuken GmbH, Fed. Rep. of Germany

[21] Appl. No.: 933,265

[22] Filed: Nov. 18, 1986

Related U.S. Application Data

[62] Division of Ser. No. 697,323, Feb. 1, 1985, abandoned.

[30] Foreign Application Priority Data

Feb. 2, 1984 [DE] Fed. Rep. of Germany ....... 3403541

[51] Int. Cl.$^4$ ............................................ B23K 37/04
[52] U.S. Cl. ...................................... 228/9; 228/20; 228/48; 228/102
[58] Field of Search ............... 228/102, 214, 219, 223, 228/9, 48, 225, 20; 219/73, 73.21, 124.34, 125.11

[56] References Cited

U.S. PATENT DOCUMENTS

| | | | |
|---|---|---|---|
| 2,819,517 | 1/1958 | Pursell | 228/225 |
| 3,080,648 | 3/1963 | Thomas | 228/219 |
| 3,658,232 | 4/1972 | Dill | 228/48 |
| 3,875,364 | 4/1975 | Boyett | 228/219 |
| 3,941,486 | 3/1976 | Tyler | 228/9 |
| 4,082,212 | 4/1978 | Headrick | 228/20 |
| 4,125,943 | 11/1978 | Ando | 228/9 |
| 4,158,161 | 6/1979 | Suzuki | 228/9 |
| 4,316,076 | 2/1982 | Balfanz | 219/124.34 |
| 4,348,574 | 9/1982 | Barger | 219/73.21 |
| 4,404,455 | 9/1983 | Gotoh | 219/124.34 |
| 4,508,953 | 4/1985 | Murakami | 228/9 |
| 4,577,499 | 3/1986 | Silke | 228/9 |

FOREIGN PATENT DOCUMENTS 0012962 6/1983 European Pat. Off. .
0050788 5/1981 Japan ................................. 228/102

Primary Examiner—Kurt Rowan
Attorney, Agent, or Firm—Allegretti & Witcoff, Ltd.

[57] ABSTRACT

The invention relates to an apparatus for automatic or remotely operated welding of the cover and/or the bottom of the walls of a container for receiving and storing radioactive fuel elements and wastes in a hot cell by employing the narrow joint welding technique, comprising at least one sensor sensing the course of the weld line between the container wall and the container cover and/or bottom effective to assist at least one three-dimensionally movable welding head controlled by control means utilizing signals supplied by the sensor to guide it along the joint for producing a continuous welding seam consisting of a plurality of super-imposed and offset weld beads or passes, respectively. To obtain improved welding results and for safe and trouble-free automatic and/or remotely operated welding, the loaded container including the attached cover and/or bottom is caused to rotate about its longitudinal axis, and the joint between the container wall and cover and/or bottom is caused to move past the sensors and the welding heads. Upon completion of the welding operation the welding slag is removed. Sensors are provided for the lateral and vertical guidance of the welding head. The welding is effected under flux. A chisel and a nailer are employed to loosen the welding slag which is removed from the weld by a suction nozzle.

6 Claims, 6 Drawing Sheets

APPARATUS FOR REMOTELY WELDING A COVER TO THE WALL OF A CONTAINER FOR STORING RADIOACTIVE FUEL ELEMENTS AND WASTES

This application is a division of application Ser. No. 697,323, filed Feb. 1, 1985 now abandoned.

The present invention relates to an apparatus for remotely welding a closure on a container for radioactive material.

Radioactive materials, such as high-level nuclear fuel elements or radioactive fission products fused into glass and cast in steel molds, must be enclosed in special containers for purposes of transportation and/or storage. The containers require strong radiation shielding and a sufficient cooling area and they must have great stability. Metal containers are open at one end for loading.

Upon loading the radioactive high-level nuclear reactor fuel elements or the radioactive waste into the storage container, a cylindrical plug is inserted into the intake opening at one end of the container and is subsequently welded to the adjacent container wall. Due to the tight closing of the container by the thick shielding cover member, the radioactive materials are safely separated from the biosphere.

In view of the radioactivity of the spent nuclear reactor fuel elements, the welding of the loaded storage container must be performed in a hot cell. This necessitates an automatic or remotely-operated welding procedure. To achieve a satisfactory gas-tight weld of the container components, narrow joint welding is the preferred technique for this purpose. Narrow joint welding causes only minor contraction stresses. Any increased stress leads to the formation of cracks in the weld. The narrow joint welding technique has been developed especially for thick-walled structural components with relatively narrow spaces therebetween.

British Pat. No. 1444479 discloses a storage container filled with spent fuel elements or radioactive waste. The storage container is closed by a deeply penetrating cylindrical plug welded into the container opening. No particulars concerning the welding operation itself are disclosed by this prior publication.

German patent application OS No. 31 38 485 relates to a container for receiving and storing radioactive materials and a method of securely sealing the container. The cover member is joined to the container wall by welding. No detailed information as to the particular welding technique employed is disclosed in this prior publication.

European patent specification No. 0012962 discloses a method and device for the automatic welding of containers used in the nuclear industry wherein the welding seam is deposited in a bevelled V-shaped groove. The welding electrode of the device progresses along the joint and is directed by vertical and lateral scanners running on the joint flanks. In this known prior apparatus, the welding device is rotated while the container being welded is stationary. The first weld bead of the first pass of the electrode is deposited against a first joint flank. Upon return of the welding electrode by executing a defined oblique movement directed toward the other flank, the next weld bead is deposited, offset by the width of one bead. At the same time, the width of each joint is measured to ascertain the number of weld beads necessary to fill the particular joint width. Upon completion of a multiple bead pass, a fresh welding cycle commences, beginning with the first weld bead of the next following pass at the first side or flank until the entire joint is filled.

The object of the present invention is to provide an apparatus for carrying out the method referred to in order to obtain better results and to ensure a safe and problem-free automatic and/or remotely operated execution of the method.

This is accomplished by rotating the container about its longitudinal axis past a stationary welder having a three-dimensionally movable head and controlling the head by sensors which monitor the dimensions of the weld. In a preferred form of the invention the welding slag is mechanically crushed or broken off and the crushed particles removed by suction. Other features will become apparent from the following specifications.

The invention affords automatic execution of the process of welding the cover to the wall of a container for receiving and storing radioactive fuel elements and radioactive wastes. Special sensing means in conjunction with control means enable the welding operation to be fully automatic. Any geometric deviations in the weld due to the particular configuration of the workpieces (container cover and wall) are detected and corrected by sensors for horizontal and vertical control of the welding head. The execution of the various welding passes and weld beads deposited per pass is automatic.

The removal of the welding slag is also automatic by means of a driven swinging blade of a chisel and swinging nails of a driven nailer. The nailer serves to remove any residual slag particulates not removed by the chisel. The construction of the nailer is such as to operate on the whole of the welding seam at once. To conform to the surface contour of the welding seam, the individual nails of the nailing device are resiliently mounted and movable relative to each other.

The present invention is employed with the known narrow joint welding method because this particular technique permits holding contraction stresses to a minimum. Increased welding stresses tended to impart distortions to the container surface and this may lead to cracks in the weld. Moreover, this welding technique is suitable to prevent the occurrence of cracks in the ceramic layer conventionally present in deposited materials.

In using the invention, it is preferred to employ submerged arc welding, which is also known as such, although, of course, welding in an atmosphere of a protective inert gas is also possible. Flux assisted welding has the advantage that greater lengths of weld may be covered for a longer period of time because the welding time, as a rule, requires several hours. Moreover, submerged arc welding has the additional advantage that the portion of the flux not used during the welding may be recovered and used again.

The apparatus according to the invention is eminently suitable for welding in a so-called hot cell because all operational steps and monitoring procedures are fully automatic and remotely controlled.

The invention will be described in further detail with reference to the accompanying drawings in which.

Figure 1:
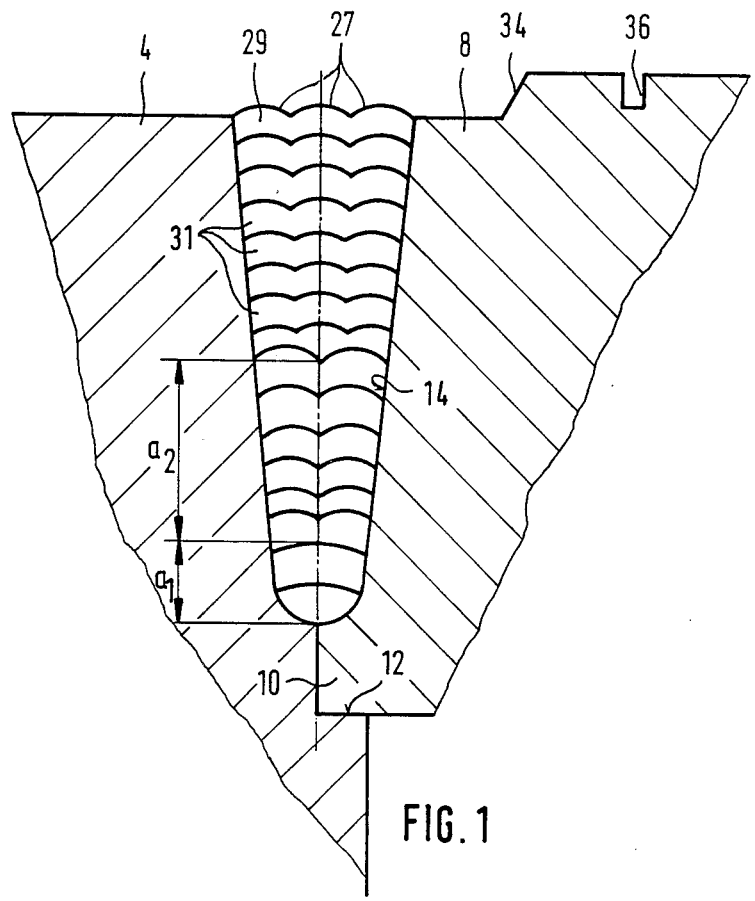
FIG. 1 is a sectional view of a part of the cover and the wall of a container welded together utilizing the invention.
Figure 6:
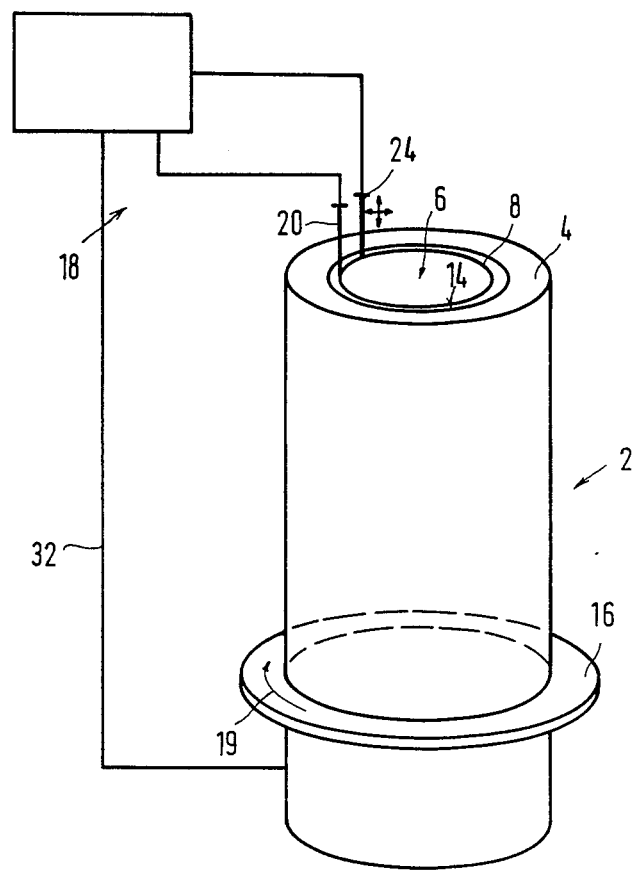
FIG. 6 is a perspective schematic view of a container about to be sealed which is disposed on a turntable moving the joint to be welded between cover and container past a welding station as schematically indicated.

The drawing in FIGS. 1 and 6 shows a container 2 for receiving radioactive fuel elements and wastes for the purpose of storage. The container comprises a cylindrical wall or shell 4 and an input opening 6 closed by a cover member 8. The cover member 8 is preferably in the form of a plug which is placed with a lower external annular flange 10 upon an internal annular ledge 12 of the container wall 4. The plug 8 and the cylinder 4 are machined on their external and internal surfaces, respectively, so that a V-shaped groove or joint 14 is formed, along which the cover is fused to the cylindrial wall by welding. The joint 14 is relatively narrow, and in order to achieve a reliable joining of the cover to the container wall and a safe sealing by way of this narrow gap, the narrow joint welding technique is employed. The narrow joint welding technique has been developed particularly for narrow joints and large cross-sections of the parts to be welded.

The apparatus for welding the container includes a motor driven turntable 16 and a quasi-stationary welder 18. The welder device 18 as a whole comprises a plurality of individual components which will be described in further detail below. The container 2 is placed upon the turntable 16 and is moved by the turntable past the welder 18 for applying the welding seam to the joint 14. The direction of rotation is indicated by the arrow 19.

For the welding operation to be fully automatic, a process computer 28 (FIG. 2) is provided which stores data relating to the dimensions of a particular weld joint, like width, depth, bevel of the joint flanks, etc., as well as data relating to the structure of the welding seam, such as height and number of passes, number of beads per pass, and similar information. Further provided is a sensor or scanner 20 for the vertical sensing of the height of each welding pass. The measuring signals of the sensor 20 are continuously fed to the process computer 28. The process computer 28, in dependence of the given stored data and the measuring signals received from the sensor 20, generates control signals for the vertical and lateral control of the welding electrodes 24,26 of device 18.

To compensate for a potential radial thrust of the container 2 on the turntable 16, the surface of the plug 8 or of the wall 4 of the container 2 is provided with a circumferential guide surface 34 or a circumferential guide groove 36 for proper guidance of the welder 18. The exterior surface of the container wall 4 may also serve as a suitable guide surface provided it has been machined to a sufficient degree of precision.

Figure 2:
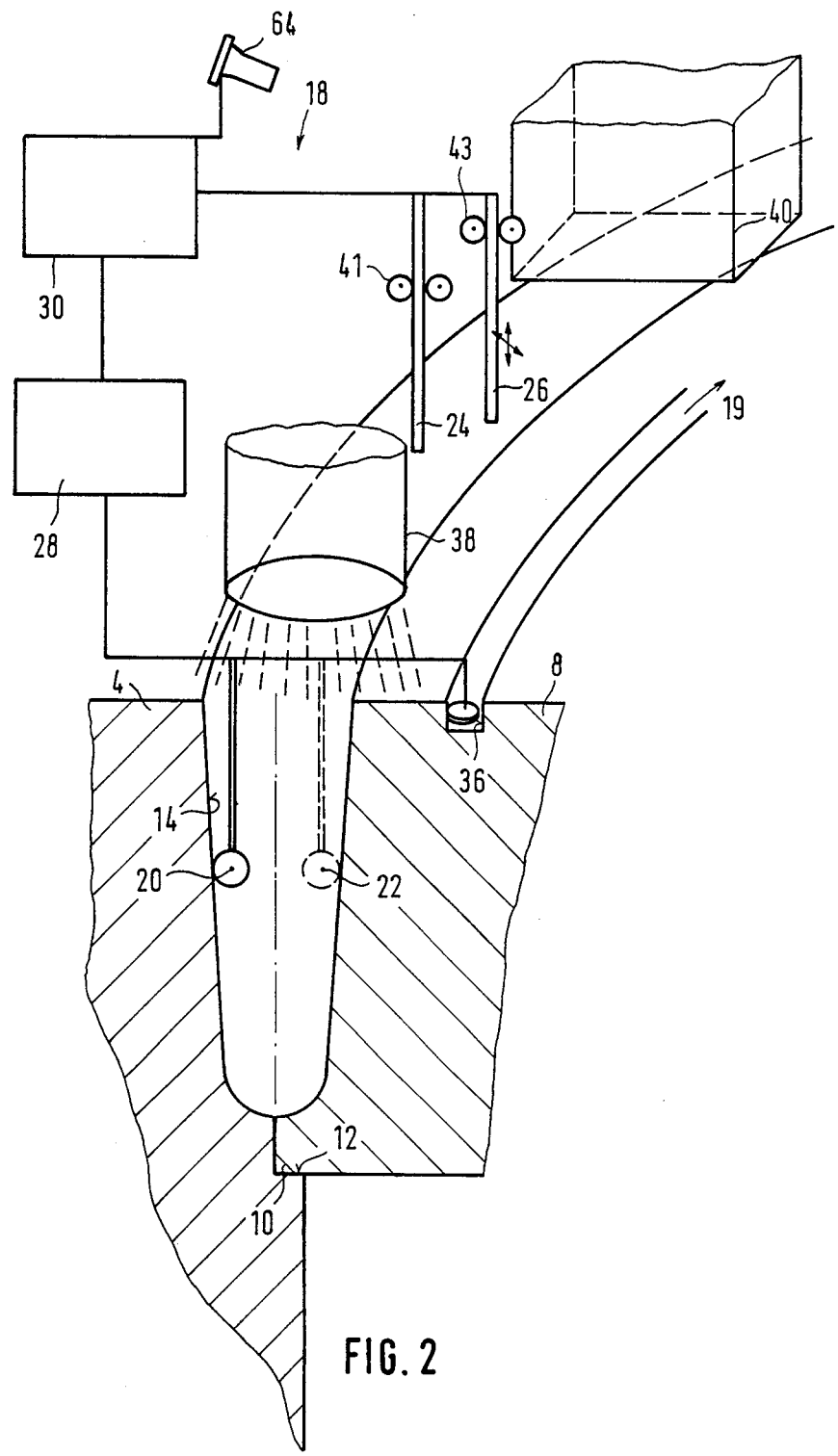
FIG. 2 illustrates schematically components parts of the invention and their arrangement relative to one another and to a weld joint between cover and container wall.

In place of the fixed data of the dimensions of the welding joint, another sensor 22 may be provided for lateral control of the welding device 18, as indicated by dashed lines in FIG. 2, in addition to the sensor 20 for vertical control. The measuring signals of both of these sensors are processed by the computer 28 to supply control signals to the welding device.

Preferably, two separately controllable welding electrodes 24,26 are provided for use as so-called leading electrode and trailing electrode, respectively. The trailing electrode 26, besides being offset toward the rear, is also offset with respect to the lead electrode 24. The distance of the two welding electrodes 24,26 transverse to the line of welding, is approximately equal to the space between two weld beads so that two beads 27 may be deposited by the two electrodes at the same time. The various welding passes 31 and weld beads per welding pass are automatically deposited with the assistance of the vertical sensor and the sensor for the joint flanks, according to the total height of the welding seam 29 and the internal configuration of the weld joint. To this end, the signals from the sensors 20,22 are supplied to the process computer 28 which controls means 30 for controlling the vertical and lateral positions of the electrodes.

The sensors may be of the capacitative or the inductive type. The lateral control function of the sensor 22 also compensates for a radial thrust of the container 2 on the turntable 16. The rotational speed of the turntable 16, and thus of the container 2, is synchronized with the welding speed. The speed may be controlled by the computer 28 by way of a line 32 (see FIG. 6).

The mode of depositing the individual welding passes 31 and beads 27 will be apparent from FIG. 1. Depending on a given joint width, the starting point for one bead per pass is in the area $a_1$. Upon reaching a definite breadth, for instance at the beginning of the area $a_2$, the welding device automatically changes from one-pass operation to two-pass operation and, upon traversing the area $a_2$, to three-pass welding. In each case the joint width is likewise ascertained by the sensors and the electronic control means.

In order to shield the weld puddle during the welding operation from contamination by the surrounding atmosphere, particularly oxygen and nitrogen, it is best to work under a protective gas or flux. In the instant case, welding beneath a layer of flux is preferred because a protective gas is not able to cover longer distances for longer periods of time. Moreover, a large volume of gas would have to be used, considering that the welding time for a container of the type herein discusssed is approximately 8 to 10 hours. Using welding flux or powder, it is possible to cover longer distances. In addition, flux has the advantage that any unused portion may be returned into the operational cycle. For this purpose, a flux supply pipe 38 is provided in the rear of the sensors 20,22 as shown in FIG. 2. The pipe 38, through which the flux is passed to the weld puddle, terminates above the welding joint 14 and in advance of the welding electrodes 24 and 26. Any unused excess flux is recovered by suction means 40 positioned behind the welding electrodes 24,26 and is returned to the flux supply pipe (not illustrated). The reference numerals 41,43 in FIG. 2 designate welding wire feed mechanisms which are known per se.

Figure 3:
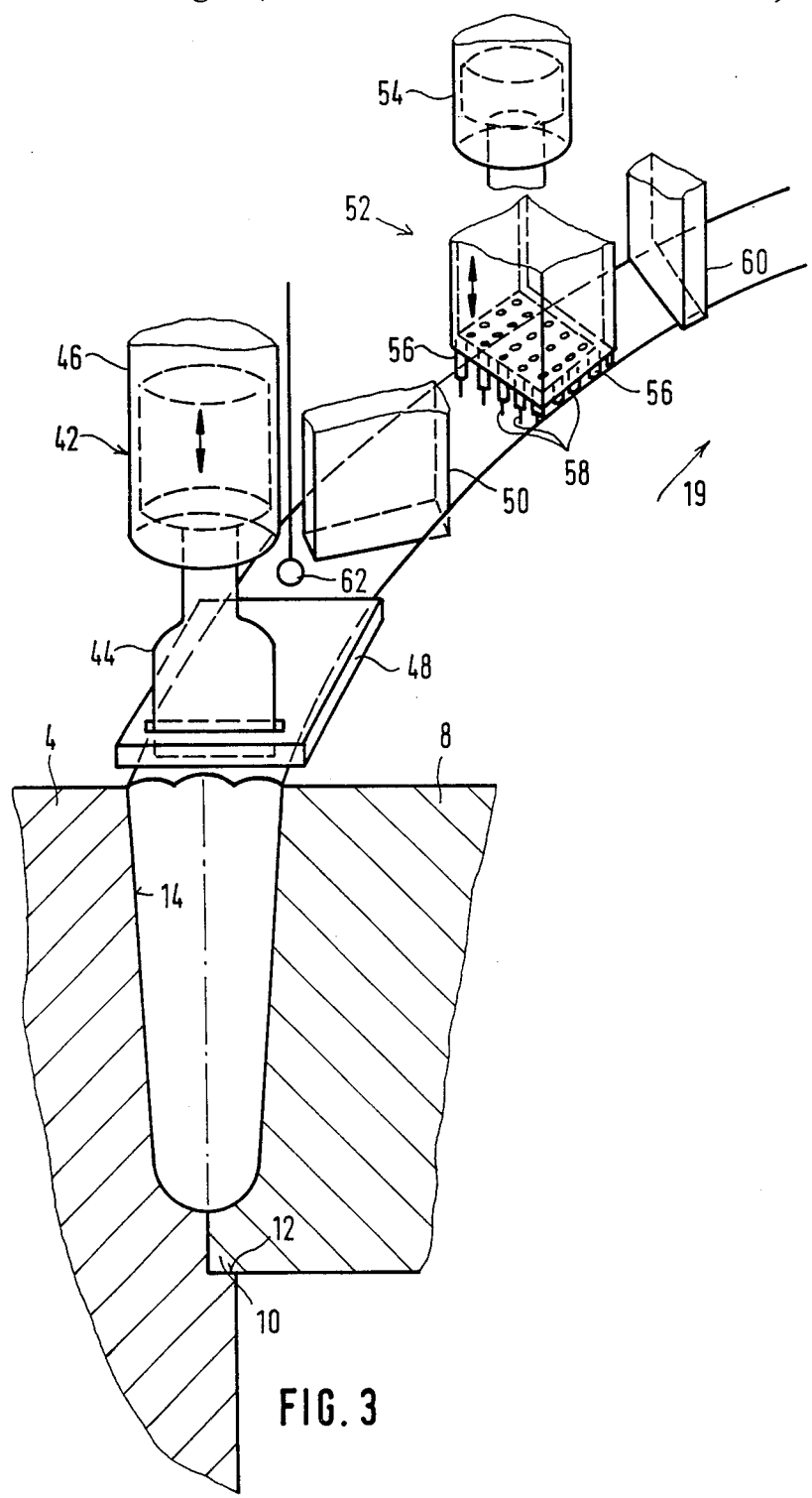
FIG. 3 illustrates schematically further component parts of the device according to the invention and their arrangement relative to one another and in the area of a joint between cover and container wall.
Figure 4:
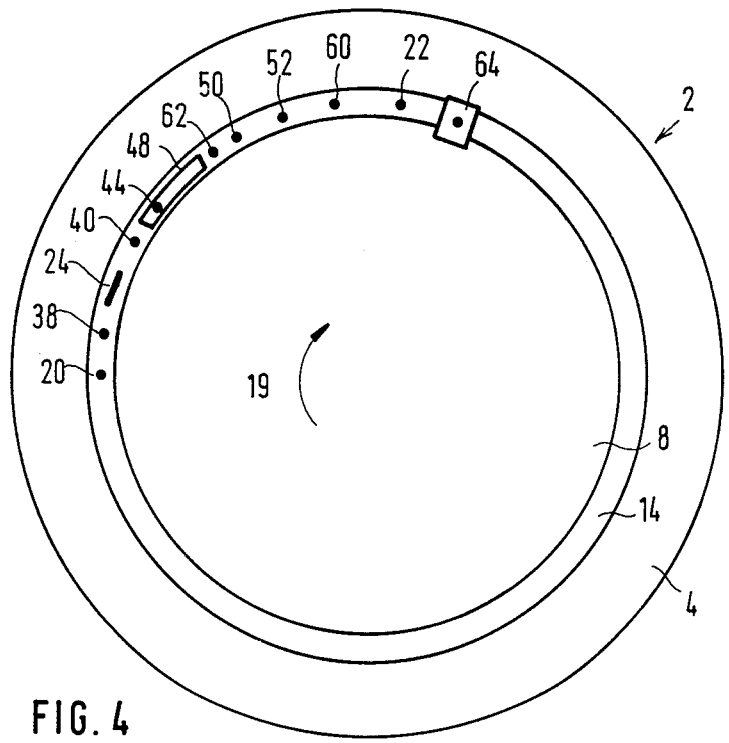
FIG. 4 is a top plan view of a container closed by a cylindrical plug, wherein the locations of the individual structural elements of the apparatus according to the invention are schematically indicated.

To remove the layer of slag from the welding seam, a chisel 42 (FIG. 3) is provided wherein the blade 44 is oscillated by a pneumatic cylinder 46 to break up the slag layer. A mechanical cover 48 is provided to prevent any slag fragments from being hurled out of the operating range of the chisel blade 44.

Disposed to the rear of the chisel 44 is a suction nozzle 50 for drawing up the slag fragments broken off by the chisel. The suction nozzle is connected to a reduced pressure source (not shown).

Since the chisel 44 is not capable of removing all of the slag, there is further provided a nailing device 52 to remove the last slag residues. The nailer is provided with a dual range pneumatic cylinder 54 which actuates a plurality of steel pins 58 movable in guide tracks 56. The steel pins are preferably resiliently disposed in the axial direction to adjust to the contour of the surface of the welding seam. Another suction nozzle 60 is positioned in the rear of the nailer 52 for drawing off the slag fragments removed by the action of the nailer 52.

The cross-section of the inlet openings of the suction nozzles is rectangular. The longer side of the rectangle is at least as long as the greatest width of the welding seam. Depending on the depth of the weld and the width of the joint at this particular point, the nozzle is tilted or obliquely directed to a degree such that all of the joint width or the weld seam width, respectively, can be vacuumed. For the automatic positioning of the suction nozzles 50,60 at an angle, the nozzles may be spring biased in their transverse position, and the exact angular position of the nozzle may be determined by a sensor 62 passing the joint flank.

Upon completion of the welding seam, an additional pass overlaying a corrosion resistant material may be performed with the same welder.

Figure 5:
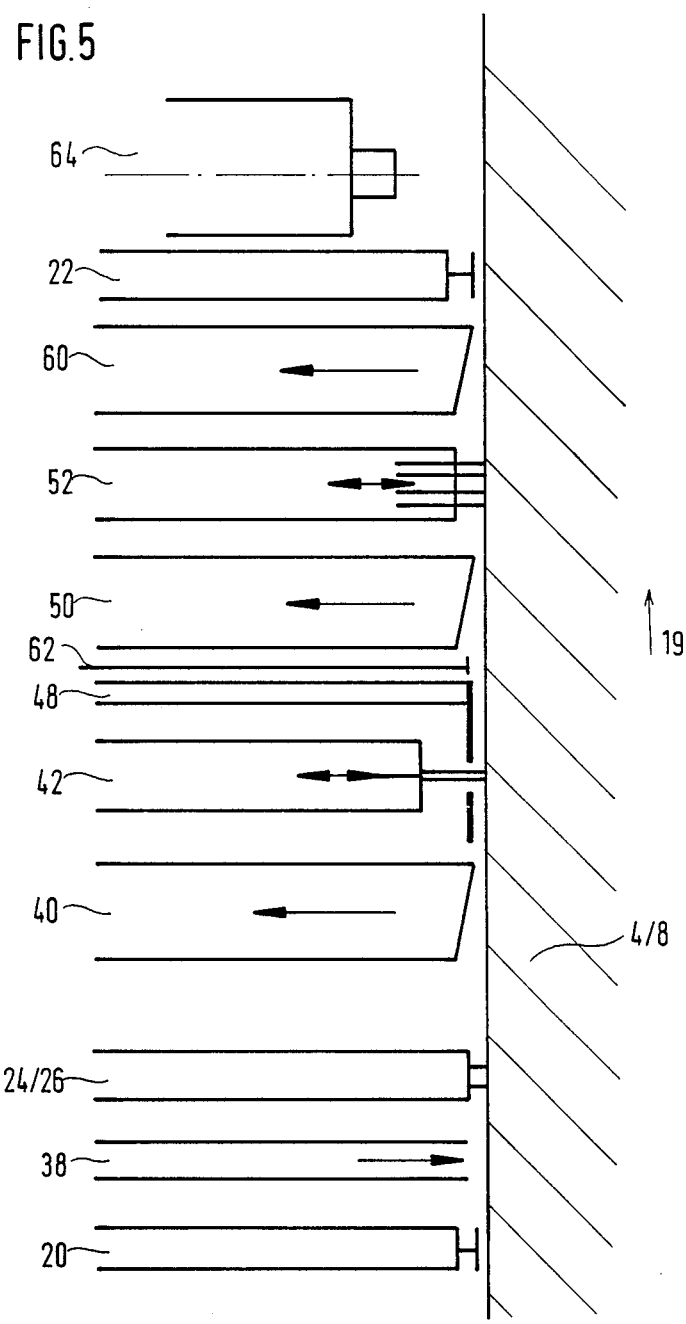
FIG. 5 illustrates schematically the parts of the entire apparatus and their arrangement relative to one another.

FIG. 2 shows the sensors for vertical and lateral control in a side-by-side relationship. However, the two sensors may also be disposed in series, as it is shown in FIG. 5. The welding seam 29 is optically controlled by a television camera 64, for example, which is attached to the welder 18.

We claim:

1. Apparatus for automatically and remotely welding a closure plug to the inner wall of the container for radioactive material employing the narrow joint welding technique which comprises
   a. a flat welding head movable in three dimensions;
   b. control means for said welding head responsive to guide means following the course of the joint;
   c. means for rotating said container past said welding head; and
   d. means for removing welding slag from the completed weld comprising
      a chisel;
      means for oscillating said chisel;
      a first suction means positioned behind said chisel;
      a nailer for loosening residual slag not chipped off by the chisel;
      said nailer comprising a plurality of guided movable steel pins disposed over the entire width of said weld, and
      a second suction means behind said nailer.

2. The apparatus of claim 1 in which said pins are resiliently mounted to adjust to the contour of the weld surface.

3. Apparatus for automatically and remotely welding a closure plug to the inner wall of the container for radioactive material employing the narrow joint welding technique which comprises
   a. a flat welding head movable in three dimensions;
   b. control means for said welding head responsive to guide means following the course of the joint;
   c. means for rotating said container past said welding head; and
   d. means for removing welding slag from the completed weld comprising
      a chisel;
      means for oscillating said chisel;
      suction means positioned behind said chisel which suction means is rectangular in cross-section, the longer side of said rectangle being equal to or greater than the greatest width of said weld, and the shorter side of said rectangle being less than the greatest width of said weld;
      means for turning said suction means obliquely to the path of said weld so that it extends across the entire width of the weld and
      a sensor for sensing the flanks of the weld and controlling said turning means to regulate the angle of said suctions means with respect to the width of said weld.

4. Apparatus for automatically and remotely welding a closure plug to the inner wall of a container for receiving radioactive material within a hot cell, comprising a welding device having a welding head movable in three dimensions and being guided along the course of the welding gap or welding groove respectively by a control means, a means for receiving and rotating the container past said welding device and a means for loosening and removing welding slag from the weld, in which the means for removing welding slag includes at least one oscillatingly driven chisel and at least one nailer comprising a plurality of guided, movable steel pins disposed over the entire width of the weld, and a suction means having suction nozzles for the loosened welding slag.

5. Apparatus of claim 4, wherein the steel pins are resiliently mounted in the axial direction.

6. Apparatus of claim 4, further comprising a control means for controlling the angular position of the suction nozzles, such that the inlet openings of the suction nozzles, being rectangular, cover the width of the gap or groove at least in the rectangular diagonal, and the control means includes a sensor sensing the flanks of the gap or the groove for controlling the position of the suction nozzles.

* * * * *